(12) United States Patent
Jang

(10) Patent No.: US 7,193,374 B2
(45) Date of Patent: Mar. 20, 2007

(54) PLANAR LIGHT SOURCE DEVICE AND LIQUID CRYSTAL DISPLAY APPARATUS HAVING THE SAME

(75) Inventor: Hyeon-Yong Jang, Osan-si (KR)

(73) Assignee: Samsung Electronics Co., Ltd. (KR)

( * ) Notice: Subject to any disclaimer, the term of this patent is extended or adjusted under 35 U.S.C. 154(b) by 107 days.

(21) Appl. No.: 11/054,213

(22) Filed: Feb. 9, 2005

(65) Prior Publication Data

US 2005/0180172 A1    Aug. 18, 2005

(30) Foreign Application Priority Data

Feb. 13, 2004   (KR) .................. 10-2004-0009531

(51) Int. Cl.
*H01B 37/02* (2006.01)
(52) U.S. Cl. .................. 315/309; 315/308; 315/56
(58) Field of Classification Search ........ 315/307–309, 315/167
See application file for complete search history.

(56) References Cited

U.S. PATENT DOCUMENTS 4,876,569 A * 10/1989 Nishitoku .............. 355/68
5,844,540 A * 12/1998 Terasaki ............... 345/102
6,713,744 B1 * 3/2004 Kubo et al. ............ 250/205
6,967,433 B2 * 11/2005 Hsu ..................... 313/491
2003/0132901 A1 * 7/2003 Shimada ................ 345/87
2005/0190171 A1 * 9/2005 Jang et al. ............. 345/204

FOREIGN PATENT DOCUMENTS

JP          08201779          * 8/1996

* cited by examiner

*Primary Examiner*—Trinh Vo Dinh
(74) *Attorney, Agent, or Firm*—Cantor Colburn LLP

(57) ABSTRACT

An LCD apparatus includes a light source generating light, a driver circuit and an LCD panel. The driver circuit includes a driving voltage control section and a driving voltage generating section. The driving voltage control section senses an environmental temperature and outputs a control signal having a level which is adjusted based on a comparison of the environmental temperature to a reference temperature. The driving voltage generating section is electrically connected to the driving voltage control and generates a driving voltage based on the control signal. The LCD panel displays an image by using the light generated from the light source. Channeling that induces deterioration of display quality is prevented by adjusting an operating frequency of the light source according to the environmental temperature.

27 Claims, 11 Drawing Sheets

1000

PLANAR LIGHT SOURCE DEVICE AND LIQUID CRYSTAL DISPLAY APPARATUS HAVING THE SAME

BACKGROUND OF THE INVENTION

1. Field of the Invention

The present invention relates to a planar light source device, and more particularly to a liquid crystal display apparatus having the planar light source device.

2. Description of the Related Art

A liquid crystal display (LCD) apparatus is a flat type display apparatus displaying images using liquid crystal. The LCD apparatus has many merits including, for example, thin thickness, lightweight, low power consumption, low driving voltage, etc., making the LCD apparatus popular for use in various fields.

Since the LCD apparatus itself does not emit light, the LCD apparatus employs a light source that provides light to the LCD apparatus. An example of a typical light source employed by the LCD apparatus is a conventional backlight assembly. The conventional backlight assembly employs either a cold cathode fluorescent lamp (CCFL) that generates linear light or a light emitting diode (LED) that generates point light. Due to limitations of the CCFL and the LED, the conventional backlight assembly requires additional components including a light guide plate, a light diffusing member, a prism sheet, etc. in order to enhance uniformity of luminance of the light emitted by the conventional backlight assembly. The additional components, however, also increase volume, weight and manufacturing cost, etc., of the LCD apparatus.

In order to solve the above-mentioned problems, a planar light source device has been developed. The planar light source device includes a light source body and electrodes disposed at end portions of the light source body. The light source body includes discharge spaces. The discharge spaces are connected to each other through connection paths to substantially equalize pressures of discharge gas in the discharge spaces, thereby enhancing uniformity of luminance of light emitted by the planar light source device.

However, when the discharge spaces are connected to each other, channeling is induced due to a cross talk between the discharge spaces. Channeling occurs when electric charges are concentrated at the connection paths of the discharge spaces, so that the electric charges flow mainly through one of the discharge spaces. Channeling increases when either temperature decreases or an operating frequency of the planar light source device increases.

SUMMARY OF THE INVENTION

The present invention provides a light source device capable of preventing channeling to enhance uniformity of luminance. The present invention also provides an LCD apparatus having the above-mentioned light source device.

In an exemplary embodiment according to the present invention, a light source device includes a light source and a driver circuit. The light source generates light. The driver circuit controls driving of the light source according to environmental temperature.

In another exemplary embodiment according to the present invention, an LCD apparatus includes a light source, a driver circuit and an LCD panel. The light source generates light. The driver circuit includes a driving voltage control section and a driving voltage generating section. The driving voltage control section senses environmental temperature and outputs a control signal having a level which is adjusted based on a comparison of the environmental temperature to the reference temperature. The driving voltage generating section is electrically connected to the driving voltage control section and generates a driving voltage based on the control signal. The LCD panel displays an image by using the light generated from the light source.

According to the present invention, channeling that induces deterioration of display quality is prevented by adjusting operating frequency. That is, when the environmental temperature is lower than a temperature that corresponds to a temperature that induces channeling under a conventional operating frequency, the operating frequency is lowered and gradually increased, thereby preventing channeling.

This application relies for priority upon Korean Patent Application No. 2004-09531 filed on Feb. 13, 2004, the contents of which are herein incorporated by reference in its entirety.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF EMBODIMENTS

It should be understood that the exemplary embodiments of the present invention described below may be modified in many different ways without departing from the inventive principles disclosed herein, and the scope of the present invention is therefore not limited to these particular flowing embodiments. Rather, these embodiments are provided so that this disclosure will be thorough and complete, and will fully convey the concept of the invention to those skilled in the art by way of example and not of limitation.

Hereinafter, the embodiments of the present invention will be described in detail with reference to the accompanied drawings.

Figure 1:
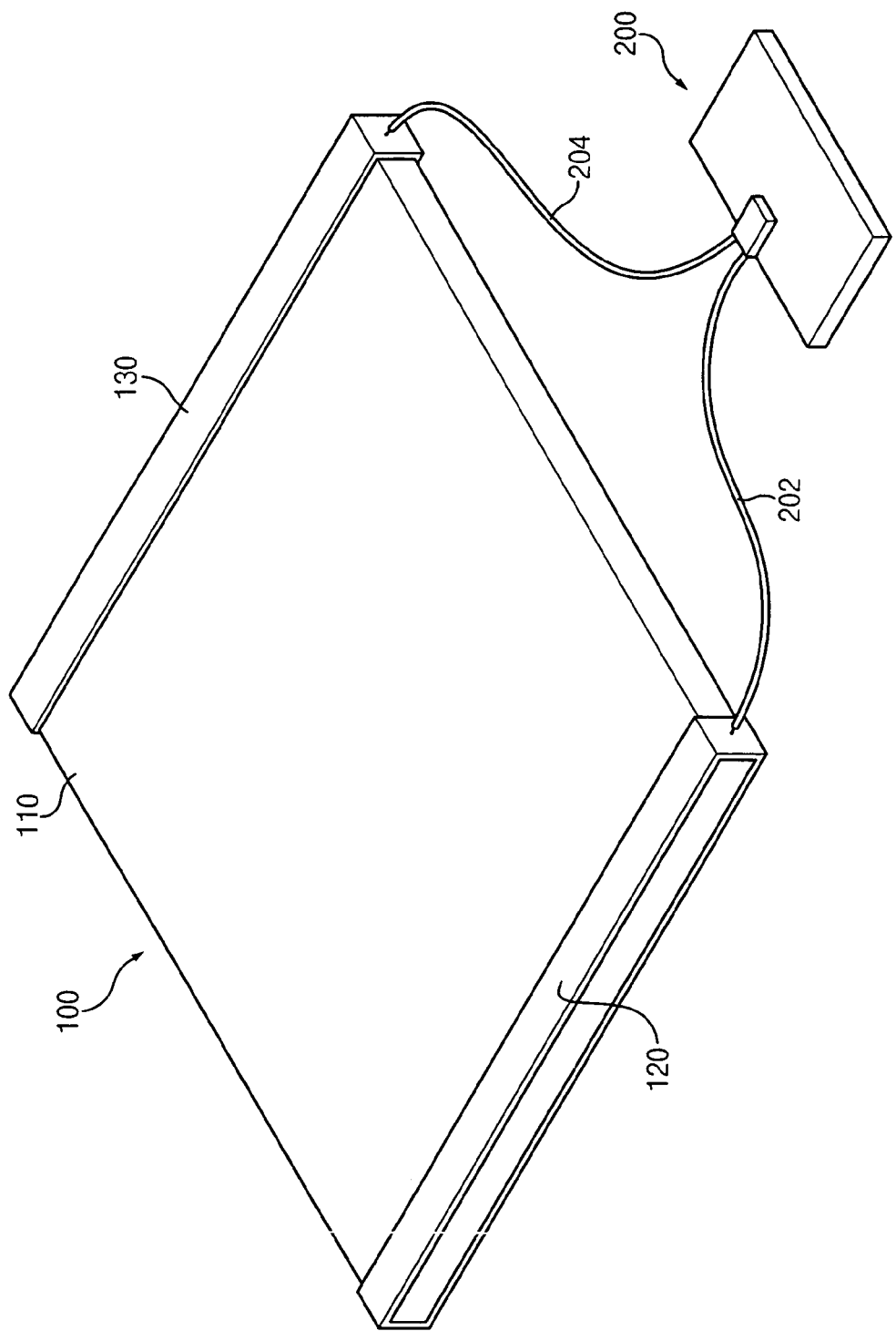
FIG. 1 is a perspective view illustrating a planar light source device according to an exemplary embodiment of the present invention.

FIG. 1 is a perspective view illustrating a planar light source device according to an exemplary embodiment of the present invention.

Referring to FIG. 1, a planar light source device 1000 according to the present embodiment includes a planar light source 100 that generates light and a driver circuit 200 that drives the planar light source 100.

The planar light source 100 includes a light source body 110, a first electrode 120 and a second electrode 130. The light source body 110 includes discharge spaces. A driving voltage is applied to the light source body 110 through the first and second electrodes 120 and 130. The first and second electrodes 120 and 130 are disposed at a first end portion and a second end portion of the light source body 110, respectively. The light source body 110 includes discharge gas in the discharge spaces. The discharge gas is electrically discharged to generate light when the driving voltage is applied to the first and second electrodes 120 and 130.

The first and second electrodes 120 and 130 surround first and second end portions of the light source body 110. In other words, the first and second electrodes 120 and 130 have a rectangular ring shape, so that first and second end portions of the light source body 110 are inserted into the first and second electrodes 120 and 130, respectively. Alternatively, the first and second electrodes 120 and 130 may have a plate shape and be disposed on surfaces of the first and second end portions of the light source body 110, respectively. In another alternative, the first and second electrodes 120 and 130 may be disposed inside the first and second end portions of the light source body 110, respectively.

The driver circuit 200 senses an environmental temperature of the planar light source 100, and controls the planar light source 100 based on the environmental temperature. In detail, the driver circuit 200 compares the environmental temperature with a reference temperature that is previously set. When the environmental temperature is lower than the reference temperature, the driver circuit 200 alters the driving voltage for driving the planar light source 100. The reference temperature is set such that the reference temperature is in a range of operating temperatures that prevent channeling. The driving voltage outputted from the driver circuit 200 is applied to the first and second electrodes 120 and 130 through a first lamp wire 202 and a second lamp wire 204, respectively.

Figure 2:
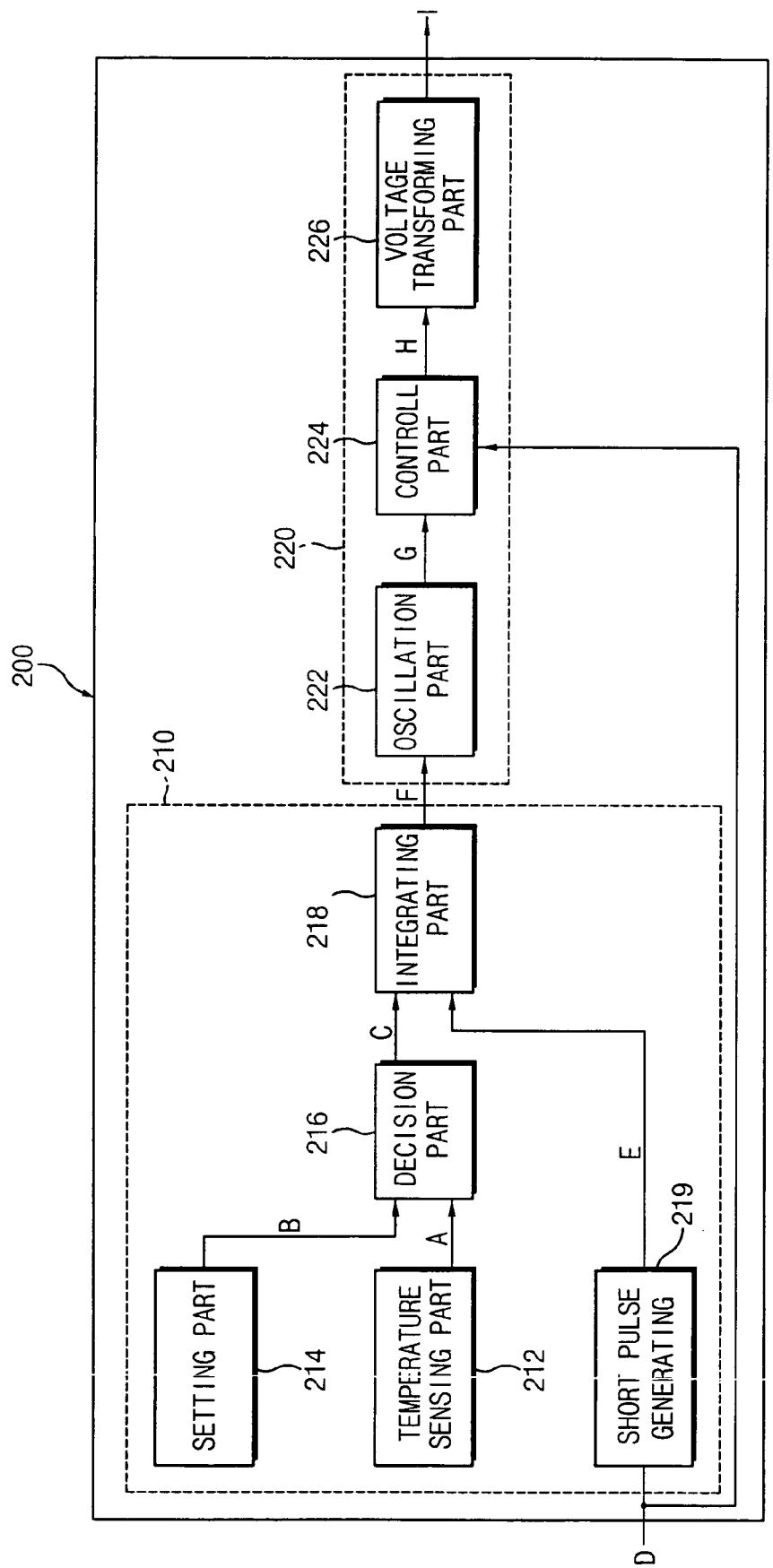
FIG. 2 is a block diagram of a driver circuit of the planar light source device in FIG. 1.

FIG. 2 is a block diagram of the driver circuit 200 of the planar light source device 1000 in FIG. 1.

Referring to FIG. 2, the driver circuit 200 includes a driving voltage control section 210 and a driving voltage generating section 220. The driving voltage control section 210 senses the environmental temperature, and compares the environmental temperature with the reference temperature to output a control signal 'F'. The driving voltage generating section 220 outputs the driving voltage 'I' in response to the control signal 'F'.

When the environmental temperature is lower than the reference temperature, the driving voltage control section 210 outputs the control signal 'F' at a low level to prevent channeling of the planar light source 100. When the environmental temperature is higher than the reference temperature, the control signal 'F' builds up to a high level for driving the planar light source 100.

The driving voltage control section 210 includes a temperature sensing part 212, a setting part 214, a decision part 216 and an integrating part 218. The temperature sensing part 212 senses the environmental temperature to output a signal corresponding to the environmental temperature. The temperature sensing part 212 includes, for example, a thermistor having an electrical resistance which varies sharply in accordance with temperature. Thus, for example, as the environmental temperature increases, the electrical resistance of the thermistor decreases. The temperature sensing part 212 outputs a first output voltage 'A' that varies linearly according to the environmental temperature. The first output voltage 'A' is applied to the decision part 216.

The setting part 214 outputs a second output voltage 'B' corresponding to the reference temperature that is set previously. The second output voltage 'B' is applied to the decision part 216. The reference temperature is set to be, for example, at a temperature of about 5° C. Mobility of mercury particles of the discharge gas is abruptly lowered at a temperature below about 5° C., thus channeling is reduced above 5° C.

The decision part 216 compares the first output voltage 'A' corresponding to the environmental temperature with the second output voltage 'B' corresponding to the reference temperature, and decides operation of the driving voltage generating section 220. For example, when the first output voltage 'A' is greater than the second output voltage 'B', the decision part 216 outputs a third output voltage 'C' at a high level. When the first output voltage 'A' is smaller than the second output voltage 'B', the decision part 216 outputs the third output voltage 'C' at a low level. The third output voltage 'C' is applied to the integrating part 218. The second output voltage 'B' is set to be in a proper range to prevent channeling when the planar light source 100 (see FIG. 1) is initially turned on.

The integrating part 218 receives the third output voltage 'C' from the decision part 216, and integrates the third output voltage 'C' to produce a direct current which is output as the control signal 'F'. The control signal 'F' is applied to the driving voltage generating section 220.

The driving voltage control section 210 further includes a short pulse generating part 219 in order to initialize the integrating part 218. The short pulse generating part 219 is electrically connected to the integrating part 218 and receives a planar light source turn-on signal 'D'. The short pulse generating part 219 applies a short pulse 'E' to the integrating part 218 in response to the planar light source turn-on signal 'D'. For example, the short pulse 'E' has a width in the range of tens of milliseconds (ms).

The driving voltage generating section 220 includes an oscillation part 222, a control part 224 and a voltage transforming part 226 in order to drive the planar light source 100 based on the control signal 'F' outputted from the driving voltage control section 210. The oscillation part 222 is electrically connected to the driving voltage control section 210 to receive the control signal 'F'. An oscillation frequency of the oscillation part 222 is changed in accordance with the control signal 'F' outputted from the integrating part 218. For example, when the level of the control signal 'F' increases, frequency of a fourth output voltage 'G' outputted from the oscillation part 222 also increases. The fourth output voltage 'G' is applied to the control part 224.

The control part 224 is electrically connected to an output terminal of the oscillation part 222. The control part 224 controls the driving voltage 'I' based on the planar light source turn-on signal 'D' and the fourth output voltage 'G'. For example, the control part 224 applies no signal to the voltage transforming part 226, before the planar light source turn-on signal 'D' is applied to the short pulse generating part 219 of the driving voltage control section 210. When the planar light source turn-on signal 'D' is applied to the short pulse generating part 219, the control part 224 applies a fifth output voltage 'H' to the voltage transforming part 226. The Is fifth output voltage 'H' is same as the fourth output voltage 'G'.

The voltage transforming part 226 boosts up the fifth output voltage 'H' to output the driving voltage 'I'. The voltage transforming part 226 includes, for example, a booster transformer (not shown).

Figure 3:
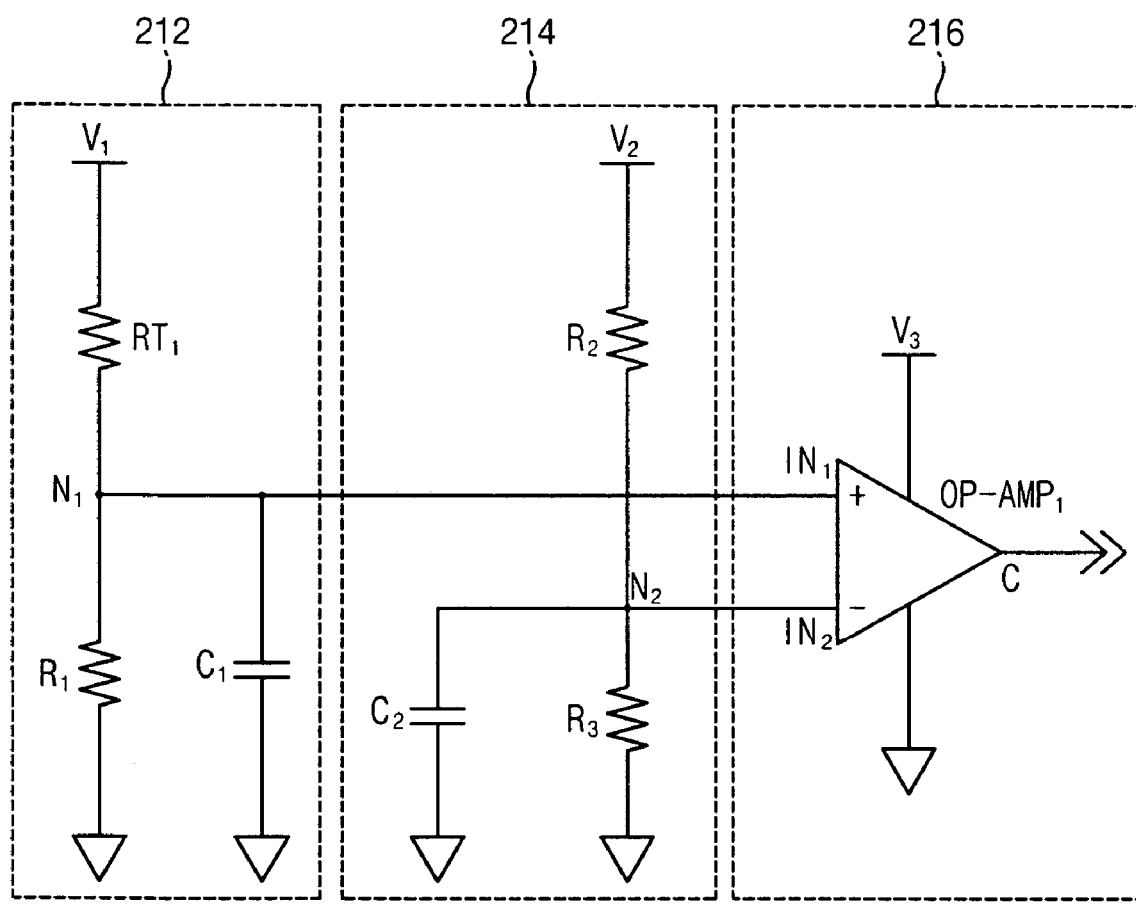
FIG. 3 is a circuit diagram of a temperature sensing part, a setting part and a decision part of the driver circuit in FIG. 2.

FIG. 3 is a circuit diagram of a temperature sensing part, a setting part and a decision part of the driver circuit 200 in FIG. 2.

Referring to FIG. 3, the temperature sensing part 212 includes a thermistor RT1, a resistor R1 and a capacitor C1. The thermistor RT1 has a first terminal to which first voltage V1 is applied, and a second terminal that is electrically connected to a first node N1. The resistor R1 has a first terminal to which ground voltage is applied and a second terminal that is electrically connected to the first node N1. The capacitor C1 has a first terminal to which ground voltage is applied and a second terminal that is electrically connected to the first node N1. The first node N1 is electrically connected to the setting part 214. When the first voltage V1 is applied to the first terminal of the thermistor RT1, the first voltage V1 is divided by the thermistor RT1 and the resistor R1, so that a first output voltage 'A' is established at the first node N1 and is applied to a first input terminal $IN_1$ of an operational amplifier OP-AMP1 of the decision part 216.

A resistivity of the thermistor RT1 is varied in accordance with an operating temperature of the planar light source 100. In the present embodiment, the thermistor RT1 of negative temperature coefficient (NTC) is employed. Thus, for example, as the operating temperature increases, the resistivity of the thermistor RT1 decreases, and vice versa. Therefore, when the operating temperature increases, the first output voltage 'A' at the first node N1 increases. When the operating temperature decreases, the first output voltage 'A' at the first node N1 decreases.

The setting part 214 includes a first resistor R2, a second resistor R3 and a capacitor C2. The first resistor R2 has a first terminal to which a second voltage V2 is applied, and a second terminal that is electrically connected to a second node N2. The second resistor R3 has a first terminal that is electrically connected to the second node N2, and a second terminal to which ground voltage is applied. The capacitor C2 has a first terminal that is electrically connected to the second node N2, and a second terminal to which that ground voltage is applied. When the second voltage V2 is applied to the first terminal of the first resistor R2, the second voltage V2 is divided by the first and second resistors R2 and R3 to produce the second output voltage 'B'. The second output voltage 'B' at the second node N2 is applied to a second input terminal $IN_2$ of the operational amplifier OP-AMP1.

The decision part 216 includes the operational amplifier OP-AMP1. The operational amplifier OP-AMP1 includes the first and second input terminals $IN_1$ and $IN_2$ that are electrically connected to the first and second nodes N1 and N2, respectively.

A third voltage V3 operates the operational amplifier OP-AMP1. The operational amplifier OP-AMP1 compares a voltage of the first node N1 and a voltage of the second node N2 to output the third output voltage 'C'. For example, when the voltage of the first node N1 is higher than the voltage of the second node N2, the operational amplifier OP-AMP1 outputs the third output voltage 'C' at a high level corresponding to the third voltage V3. When the voltage of the first node N1 is lower than the voltage of the second node N2, the operational amplifier OP-AMP1 outputs the third output voltage 'C' at a low level corresponding to ground voltage.

Figure 4:
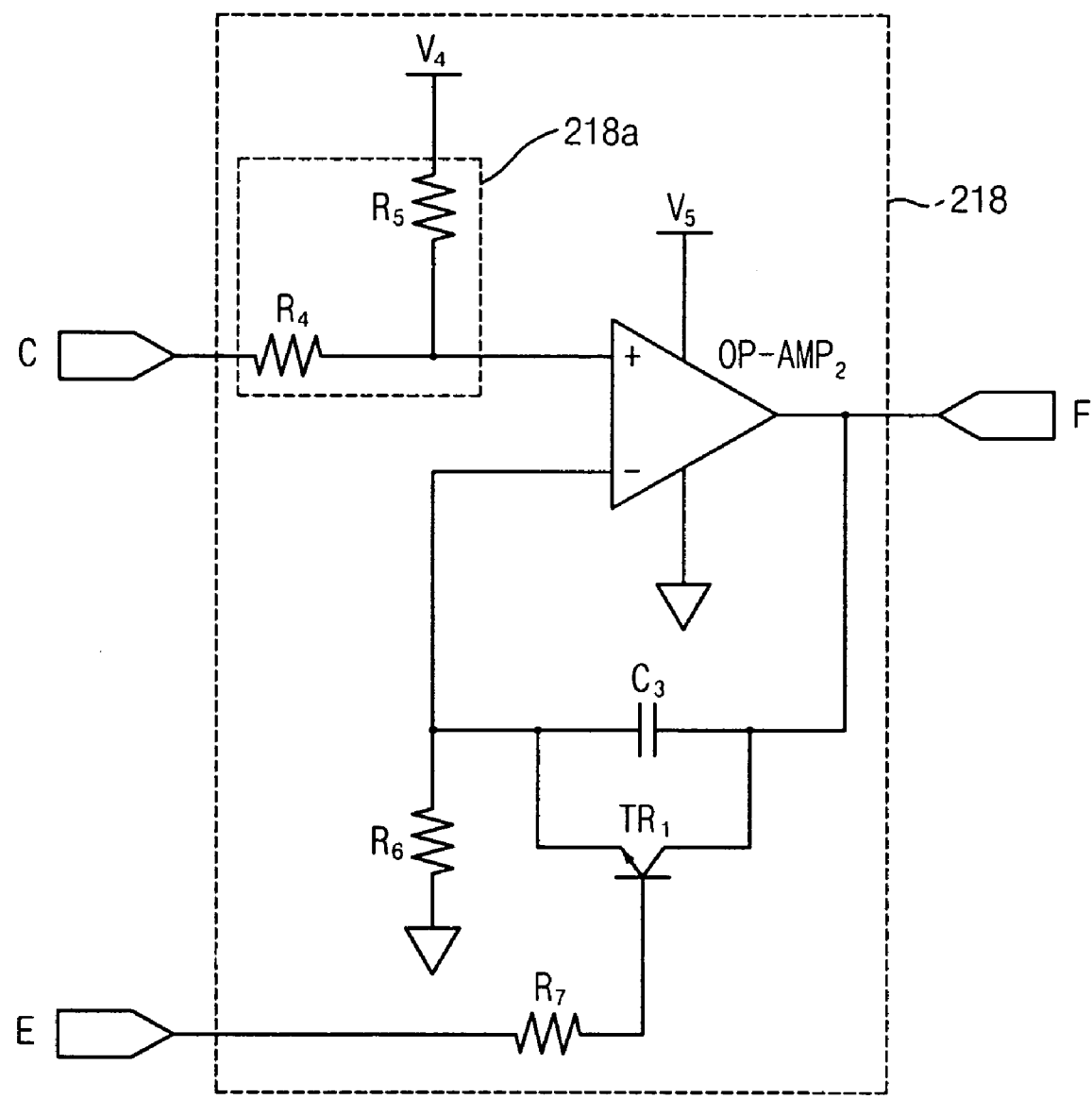
FIG. 4 is a circuit diagram of an integrating part of the driver circuit in FIG. 2.

FIG. 4 is a circuit diagram of the integrating part of the driver circuit 200 in FIG. 2.

Referring to FIG. 4, the integrating part 218 includes a resistor group 218a having a first resistor R4 and a second resistor R5. The integrating part 218 also includes an operational amplifier OP-AMP2, a third resistor R6 and a capacitor C3. The first resistor R4 of the resistor group 218a includes a first terminal to which the third output voltage 'C' is applied, and a second terminal that is electrically connected to a first input terminal of the operational amplifier OP-AMP2. The second resistor R5 of the resistor group 218a includes a first terminal to which a fourth voltage V4 is applied, and second terminal that is electrically connected to the first input terminal of the operational amplifier OP-AMP2. The capacitor C3 includes a first terminal that is electrically connected to a second input terminal of the operational amplifier OP-AMP2, and a second terminal that is electrically connected to an output terminal of the operational amplifier OP-AMP2. The third resistor R6 includes a first terminal that is electrically connected to the second input terminal of the operational amplifier OP-AMP2, and a second terminal to which ground voltage is applied.

The integrating part 218 integrates the third output voltage 'C' applied to the first input terminal of the operational amplifier OP-AMP2 through the resistor group 218a to output the direct current, which corresponds to the control signal 'F'.

The integrating part 218 further includes a transistor TR1 and a fourth resistor R7 in order to initialize the integrating part 218. The transistor TR1 includes an emitter terminal that is electrically connected to the first terminal of the capacitor C3, a collector terminal that is electrically connected to the second terminal of the capacitor C3, and a base terminal that is electrically connected to a first terminal of the fourth resistor R7. The fourth resistor R7 includes the first terminal that is electrically connected to the base terminal of the transistor TR1, and a second terminal to which the short pulse 'E' is applied.

Referring to FIGS. 2 and 4, when the planar light source turn-on signal 'D' is applied to the short pulse generating part 219, the short pulse generating part 219 applies the short pulse 'E' to the base terminal of the transistor TR1 through the fourth resistor R7 to turn on the transistor TR1. When the transistor TR1 is turned on, an electric charge stored in the capacitor C3 is discharged through the third resistor R6. Therefore, the control signal 'F' is initially lowered to be substantially ground voltage, and the control signal 'F' increases over time.

Figure 5:
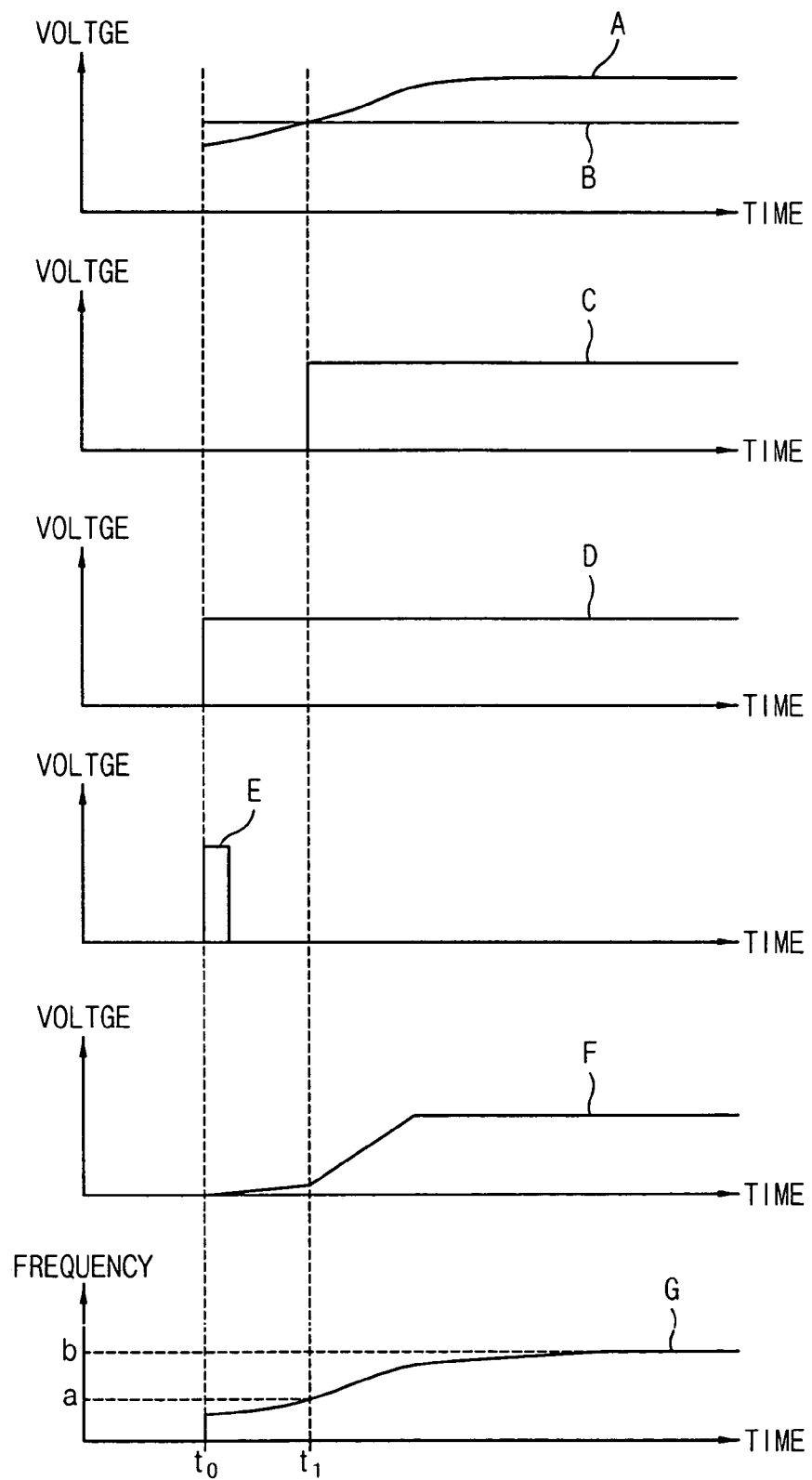
FIG. 5 is a timing chart illustrating an operation of the driver circuit in FIG. 2.

FIG. 5 is a timing chart illustrating an operation of the driver circuit in FIG. 2.

Referring to FIGS. 2, 4 and 5, the second output voltage 'B' outputted from the setting part 214 has a constant value corresponding to the reference temperature that is previously set. The first output voltage 'A' outputted from the temperature sensing part 212 increases as the environmental temperature increases until the first output voltage 'A' reaches a maximum value. When the environmental temperature is lower than the reference temperature, the first output voltage 'A' has a lower level than that of the second output voltage 'B'. However, the first output voltage 'A' increases to a level higher than that of the second output voltage 'B' after a time point $t_1$.

The third output voltage 'C' outputted from the decision part 216 has substantially ground voltage when the first output voltage 'A' is lower than the second output voltage 'B'. The third output voltage 'C' has the high level when the first output voltage 'A' is higher than the second output voltage 'B'. In other words, the third output voltage 'C' is transformed from the low level to the high level at the time point $t_1$.

The planar light source turn-on signal 'D' is applied to the short pulse generating part 219 of the driver circuit 200 at a time point $t_0$ that is prior to the time point $t_1$. When the planar light source turn-on signal 'D' is applied to the short pulse generating part 219, the short pulse generating part 219 generates a short pulse 'E' having a width that is, for example, in the range of tens of milliseconds (ms). When the short pulse 'E' is applied to the integrating part 218, the integrating part 218 is initialized by discharging electric charges that may be stored in the capacitor C3 of the integrating part 218.

The control signal 'F' outputted from the integrating part 218 increases slowly between the time point to and the time point $t_1$, and the control signal 'F' increases rapidly after the time point $t_1$ to reach the high level. As the level of the control signal 'F' increases, the fourth output voltage 'G' increases in frequency. Thus, the fourth output voltage 'G' outputted from the oscillation part 222 has a frequency that is lower than an operating start frequency 'a' before the time point $t_1$. However, frequency of the fourth output voltage 'G' exceeds the operating start frequency 'a' after the time point $t_1$ and increases to reach a normal operating frequency 'b'.

Figure 6:
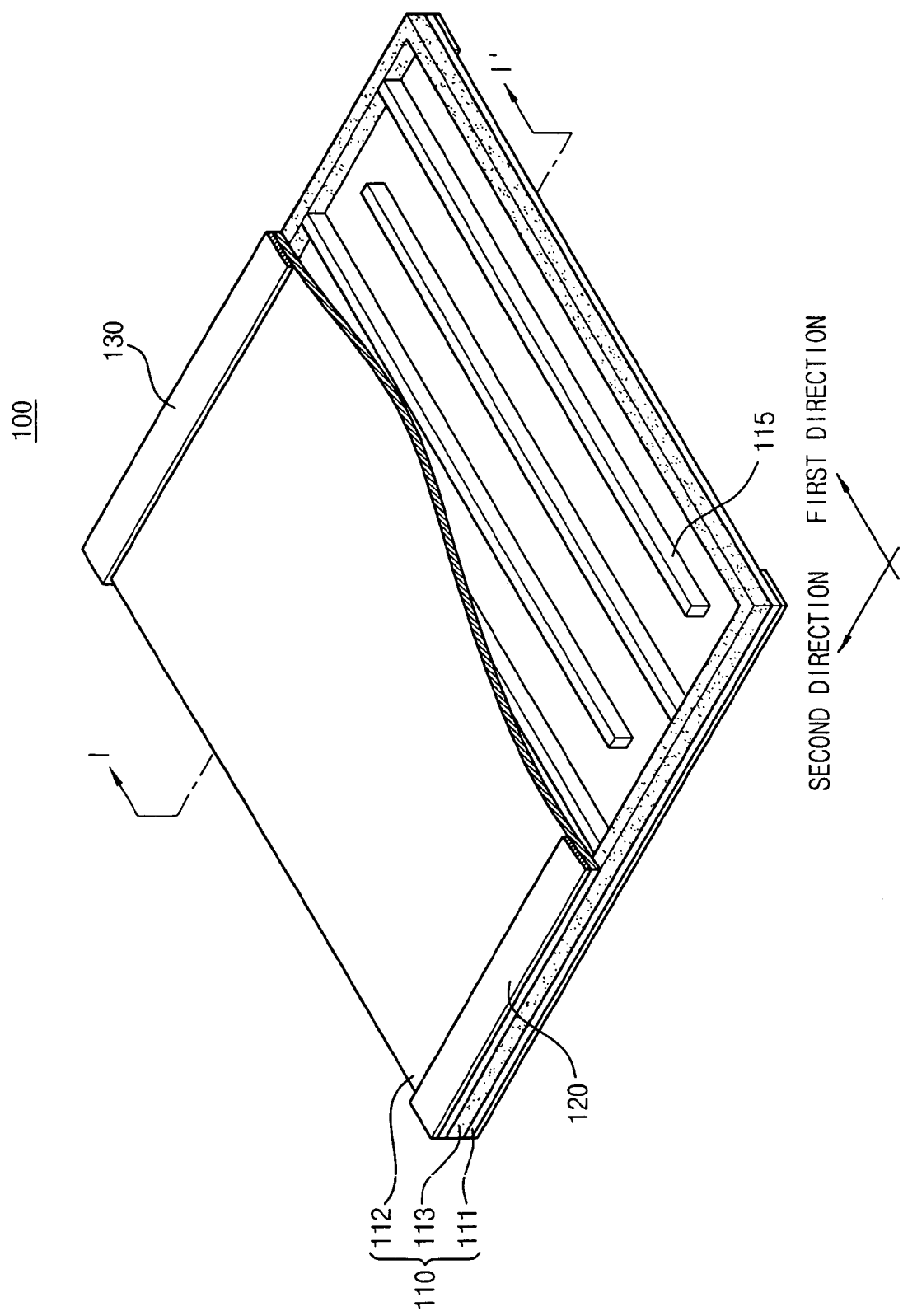
FIG. 6 is a partially cutout perspective view illustrating the planar light source device in FIG. 1.
Figure 7:
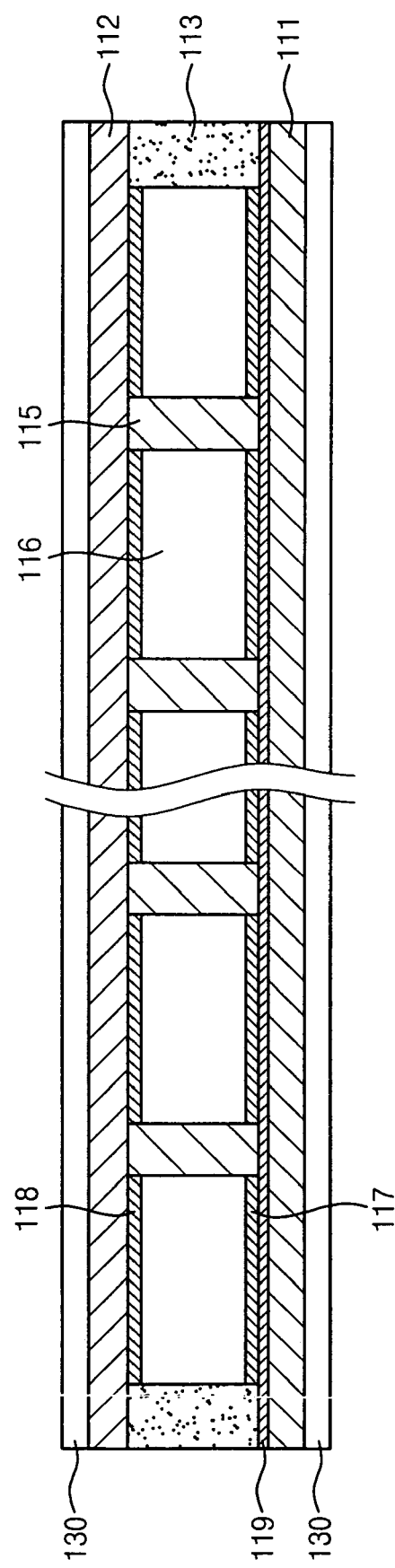
FIG. 7 is a cross-sectional view taken along a line I–I' in FIG. 6.

FIG. 6 is a partially cutout perspective view illustrating the planar light source 100 in FIG. 1, and FIG. 7 is a cross-sectional view of the planar light source 100 taken along a line I–I' in FIG. 6.

Referring to FIGS. 6 and 7, the planar light source 100 includes the light source body 110 having the discharge spaces 116, and the first and second electrodes 120 and 130 formed at the first and second end portions of the light source body 110, respectively.

The light source body 110 includes a first substrate 111, a second substrate 112 and a sealing member 113. The first and second substrates 111 and 112 are spaced apart and are disposed substantially parallel to each other. The sealing member 113 is disposed between the first and second substrates 111 and 112 along edge portions of the first and second substrates 111 and 112. For example, a glass substrate may be employed as the first and second substrates 111 and 112. The sealing member 113 combines the first and second substrates 111 and 112 to define a space between the first and second substrates 111 and 112. When the first and second substrates 111 and 112 are integrally formed, the sealing member 113 is not required.

The light source body 110 may further include one or more partition members 115. The partition members 115 are disposed between the first and second substrates 111 and 112 to divide the space between the first and second substrates 111 and 112 and define the discharge spaces 116. The partition members 115 are each extended in a first direction as shown in FIG. 6. The partition members 115 are disposed substantially parallel to each other. Each of the partition members 115 makes contact with the first and second substrates 111 and 112. The partition members 115 may be disposed such that at least one end portion of each partition member 115 is spaced apart from the sealing member 113.

Alternatively, one end of each partition member 115 makes contact with the sealing member 113. For example, a first end of odd numbered partition members 115 makes contact with the sealing member 113, and a second end of even numbered partition members 115 makes contact with the sealing member 113, so that the discharges spaces 116 defined between the partition members 115 are connected to each other to form a serpentine shape. When the discharge spaces 116 are electrically connected to each other, pressure of the discharge gas injected into the discharge spaces 116 remains substantially the same. The partition members 115 may include different material from that of the sealing member 113. Alternatively, the partition members 115 may include the same material as that of the sealing member 113, and the partition members 115 may be formed together with the sealing member 113.

The first and second electrodes 120 and 130 are disposed at an outer surface of the first and second end portions of the light source body 110, respectively. The first and second electrodes 120 and 130 are disposed along a second direction that is substantially perpendicular to the first direction. The first and second electrodes 120 and 130 have, for example, a rectangular ring shape, and the first and second end portions of the light source body 110 are inserted into the first and second electrodes 120 and 130, respectively. Alternatively, the first and second electrodes 120 and 130 may have a plate shape, and the first and second electrodes 120 and 130 may be disposed on the first and second end portions of either the first substrate 111, the second substrate 112, or both of the first and second substrates 111 and 112.

The first and second substrates 120 and 130 include metal having high electrical conductivity. The first and second substrates 120 and 130 include, for example, copper (Cu), nickel (Ni), aluminum (Al), silver (Ag), etc. The first and second substrates 120 and 130 have sufficient area to provide power for inducing an electrical discharge of the discharge gas in the discharge spaces 116.

The planar light source 100 further includes first and second fluorescent layers 117 and 118. The first fluorescent layer 117 is formed on a surface of the first substrate 111 facing the second substrate 112. The second fluorescent layer 118 is formed on a surface of the second substrate 112 facing the first substrate 111. The first and second fluorescent layers 117 and 118 are not formed on a region where the first and second substrates 111 and 112 make contact with the partition members 115. A third fluorescent layer (not shown) may be formed on side faces of the partition members 115. The first and second fluorescent layers 117 and 118 convert ultraviolet light into visible light.

The planar light source 100 may further include a light-reflecting layer 119. The light-reflecting layer 119 is formed between the first substrate 111 and the first fluorescent layer 117. The light-reflecting layer 119 reflects a portion of the visible light toward the second substrate 112.

The planar light source 100 may further include a protection layer (not shown). The protection layer is disposed between the first substrate 111 and the light-reflecting layer 119 and between the second substrate 112 and the second fluorescent layer 118. The protection layer prevents a chemical reaction between mercury gas of the discharge gas and the first and second substrates 111 and 112.

Figure 8:
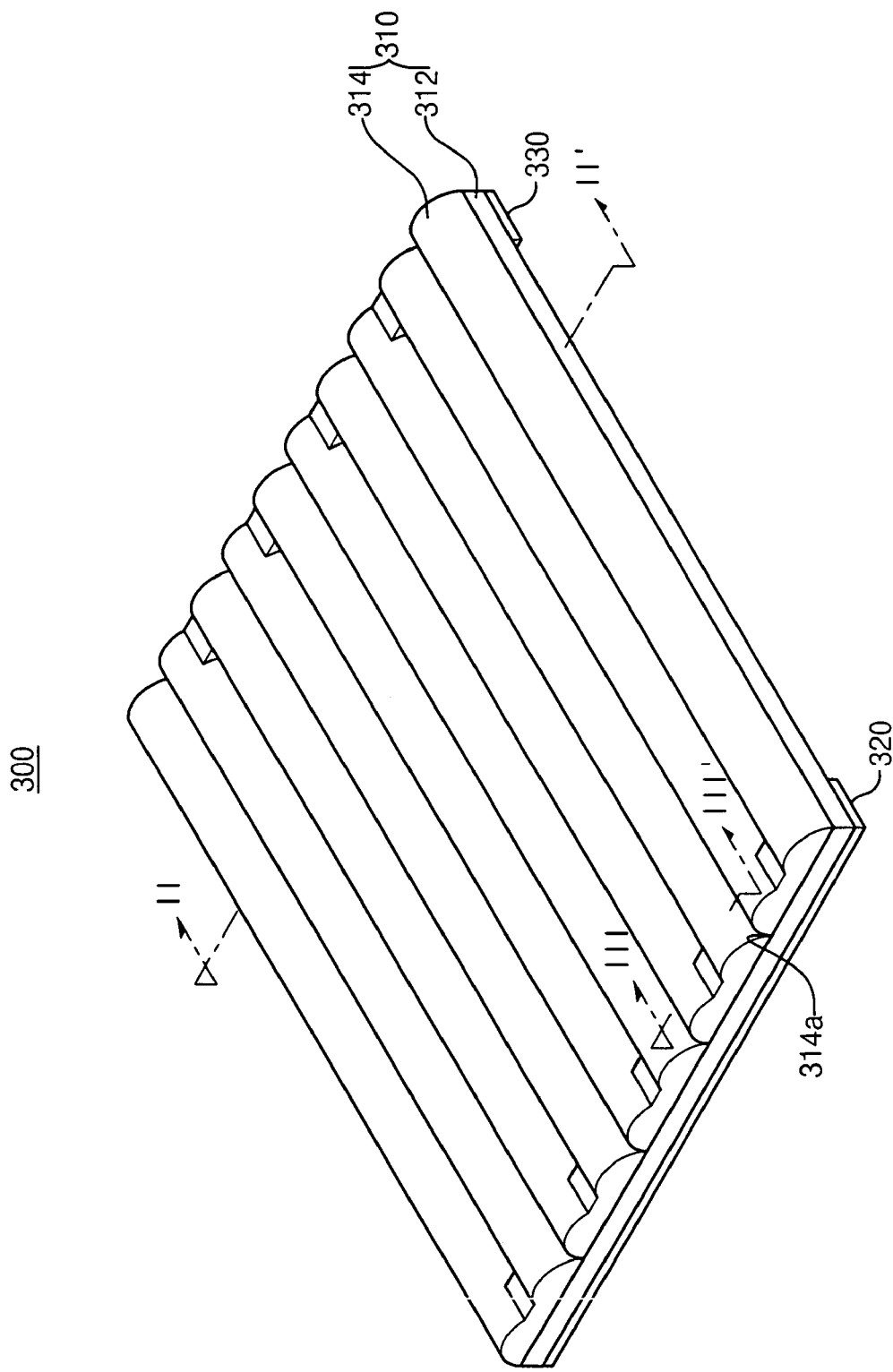
FIG. 8 is a perspective view illustrating a planar light source device according to another exemplary embodiment of the present invention.
Figure 9:
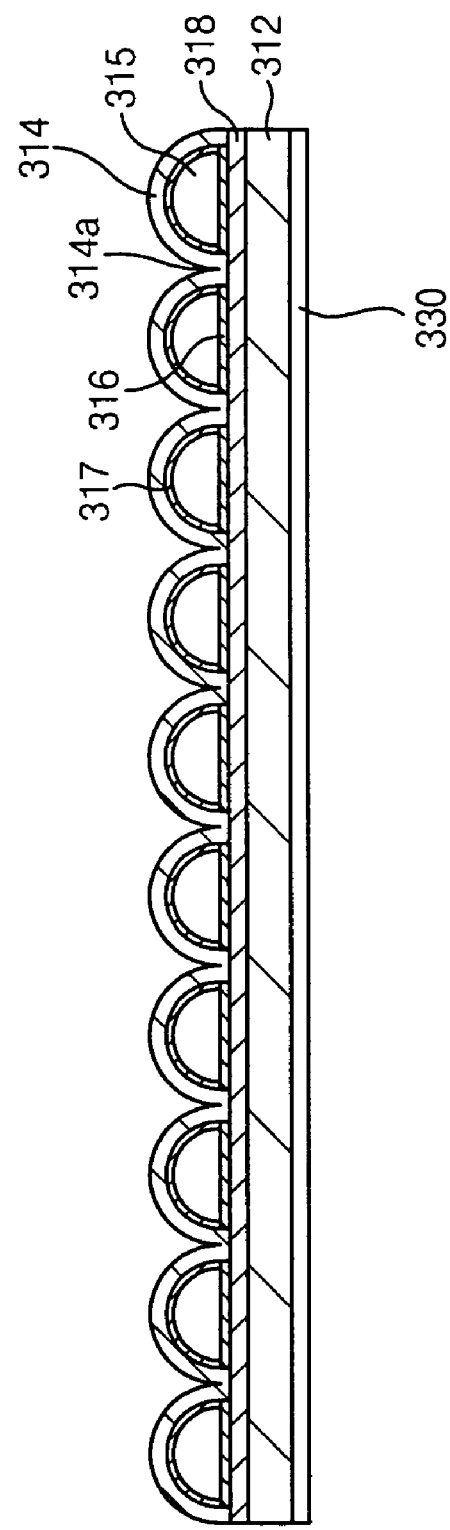
FIG. 9 is a cross-sectional view taken along a line II–II' in FIG. 8.

FIG. 8 is a perspective view illustrating a planar light source device according to another exemplary embodiment of the present invention. FIG. 9 is a cross-sectional view of the planar light source taken along a line II–II' in FIG. 8, and FIG. 10 is a cross-sectional view of the planar light source taken along a line III–III' in FIG. 8.

Figure 10:
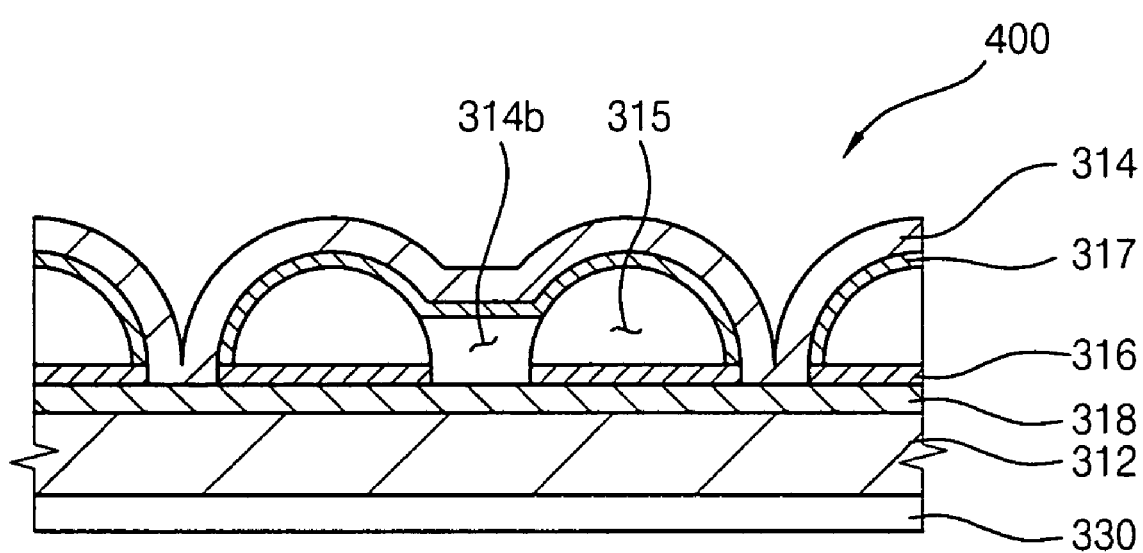
FIG. 10 is a cross-sectional view taken along a line III–III' in FIG. 8.

Referring to FIGS. 8, 9 and 10, a planar fight source 300 according to the present embodiment includes a light source body 310 having discharge spaces 315, and first and second electrodes 320 and 330 disposed at first and second end portions of the light source body 310, respectively.

The light source body 310 includes a first substrate 312 and a second substrate 314. The first and second substrates 312 and 314 have, for example, a rectangular shape. The first and second substrates 312 and 314 are combined with each other to form a space therebetween.

The second substrate 314 includes furrows 314a in order to divide the space into discharge spaces 315. The second substrate 314 having the furrows 314a is formed into a rectangular shape having a length and a width corresponding to a length and a width of the first substrate 312. A cross-section of the second substrate 314 between the furrows 314a has, for example, an arch-shape. Alternatively, the cross-section of the second substrate 314 between the furrows 314a may have various shapes such as a trapezoidal shape having rounded corners. The first and second substrates 312 and 314 are combined with each other through an adhesive such as glass including lead (Pb). The adhesive is disposed between the first and second substrates 312 and 314 along edge portions of the first and second substrates 312 and 314.

The discharge spaces 315 defined by the furrows 314a are connected to each other through connection path 314b corresponding to a portion of the furrows 314a, which do not make contact with the first substrate 312. The connection path 314 is alternately disposed at a first end and a second end, respectively, of adjacent furrows 314a. For example, the connection path 314b is formed at the first end of odd numbered furrows 314a and the second end of even numbered furrows 314a, so that discharge spaces 315 between the furrows 314a are connected to form the serpentine shape. As described above, the discharge spaces 315 are connected to each other to keep the pressure of each discharge space 315 substantially the same. The first and second electrodes 320 and 330 are disposed at first and second ends of the first substrate 312, respectively.

The planar light source 300 further includes first and second fluorescent layers 316 and 317, and a light-reflecting layer 318. The first and second fluorescent layers 316 and 317 are formed on an inner surface of the first and second substrates 312 and 314, respectively. The light-reflecting layer 318 is interposed between the first substrate 312 and the first fluorescent layer 316. The first and second fluorescent layers 316 and 317 and the light-reflecting layer 318 are substantially the same as those of previous embodiments so any further explanation will be omitted.

Figure 11:
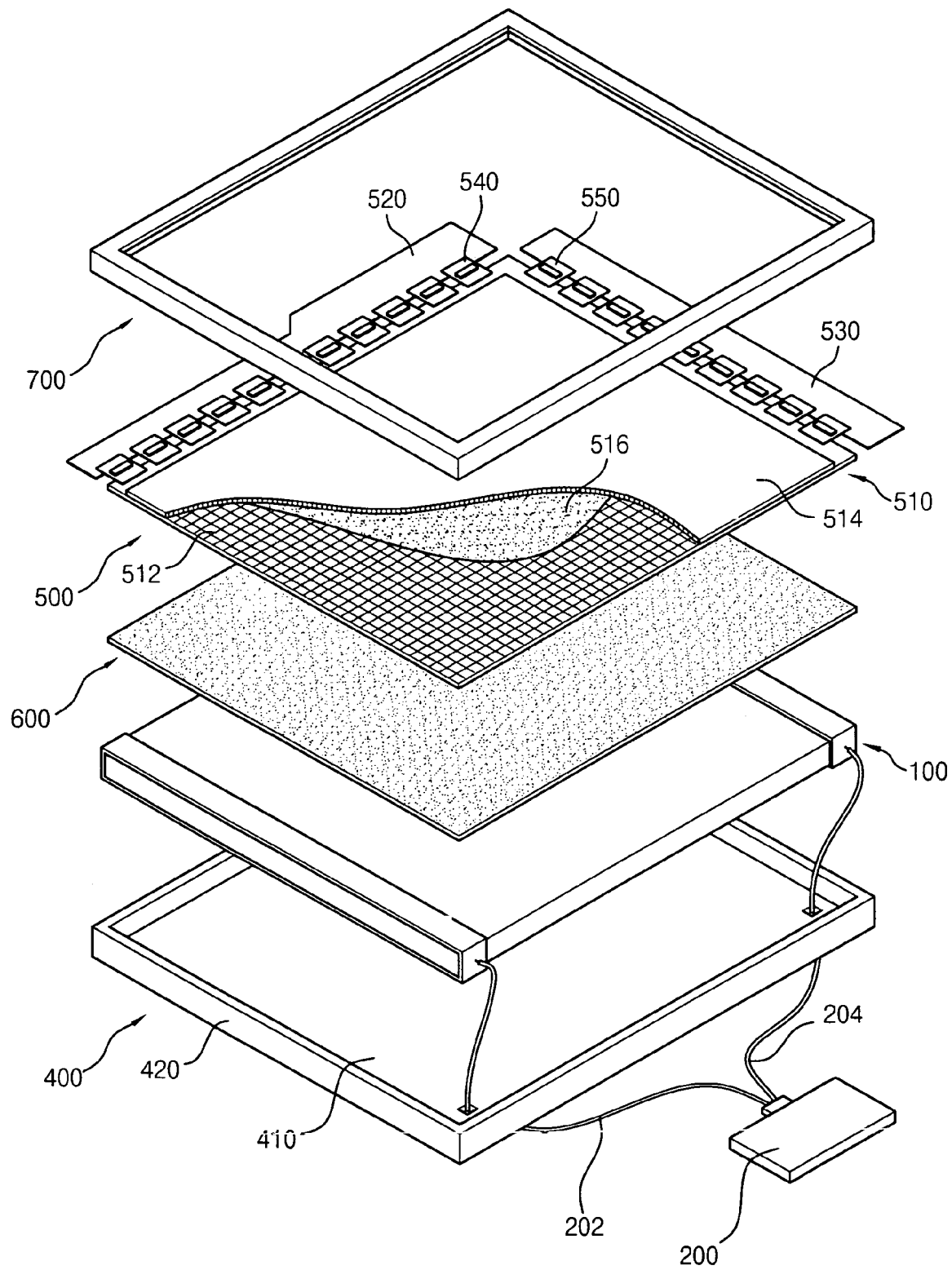
FIG. 11 is an exploded perspective view illustrating a liquid crystal display apparatus according to an exemplary embodiment of the present invention.

FIG. 11 is an exploded perspective view illustrating a liquid crystal display apparatus according to an exemplary embodiment of the present invention. The planar light source 100 and the driver circuit 200 in this embodiment are same as that of the previous embodiments so any further explanation thereof will be omitted.

Referring to FIG. 11, a liquid crystal display (LCD) apparatus 2000 according to the present embodiment includes a planar light source 100, a receiving container 400, a driver circuit 200 and a display unit 500. The display unit 500 includes an LCD panel 510 that displays an image, a data printed circuit board (PCB) 520 and a gate PCB 530. The data and gate PCBs 520 and 530 are electrically connected to the LCD panel 510 through a data tape carrier package (TCP) 540 and a gate TCP 550, respectively.

The LCD panel 510 includes a thin film transistor (TFT) substrate 512, a color filter substrate 514 facing the TFT substrate 512, and a liquid crystal layer 516 interposed between the TFT substrate 512 and the color filter substrate 514. The TFT substrate 512 includes a glass substrate and a plurality of TFTs arranged on the glass substrate in a matrix shape. Each TFT includes a gate electrode that is electrically connected to a gate line, a source electrode that is electrically connected to a data line, and a drain electrode that is electrically connected to a pixel electrode (not shown). The pixel electrode includes optically transparent and electrically conductive material such as indium tin oxide (ITO), indium zinc oxide (IZO), etc. The color filter substrate 514 includes red, green, and blue (RGB) color filters and a common electrode that is formed on the RGB color filters. The LCD panel 510 displays an image by using light provided by the planar light source 100.

The receiving container 400 includes a bottom plate 410 and sidewalls 420. The sidewalls 420 are extended upward from edges of the bottom plate 410. The receiving container 400 receives the planar light source 100. The sidewalls 420 make contact with sides of the planar light source 100 to fasten the planar light source 100 to the receiving container 400. The driver circuit 200 is disposed on a backside of the receiving container 400.

The LCD apparatus 2000 further includes an optical sheet 600 and a top chassis 700. The optical sheet 600 is disposed between the planar light source 100 and the LCD panel 510. The optical sheet 600 enhances optical characteristics such as uniformity of luminance of light generated by the planar light source 100. The optical sheet 600 may include a light-diffusing sheet for diffusing light, a prism sheet for condensing light, etc. The top chassis 700 surrounds edge portions of the LCD panel 510, and is combined with the receiving container 400. The top chassis 700 protects the LCD panel and prevents the LCD panel from being separated from the receiving container 400.

According the present invention, channeling that induces deterioration of display quality is prevented by adjusting the operating frequency. In other words, when the environmental temperature is lower than a temperature below which channeling occurs using a conventional operating frequency, the operating frequency is lowered and gradually increased, thereby preventing channeling.

Having described the exemplary embodiments of the present invention and its advantages, it is noted that various changes, substitutions and alterations can be made herein without departing from the spirit and scope of the invention as defined by appended claims.

What is claimed is:

1. A light source device comprising:
   a light source that generates a light; and
   a driver circuit configured to control driving of the light source according to an environmental temperature of the light source device,
   wherein the driver circuit comprises:
   a driving voltage control section configured to sense the environmental temperature and output a control signal having a level which is adjusted based on a comparison of the environmental temperature to a reference temperature; and
   a driving voltage generating section electrically connected to the driving voltage control section, the driving voltage generating section configured to generate a driving voltage based on the control signal,
   wherein the driving voltage control section outputs the control signal at a high level when the environmental temperature is higher than the reference temperature, and outputs the control signal at a low level when the environmental temperature is lower than the reference temperature to prevent channeling.

2. The light source device of claim 1, wherein the light source comprises:

a light source body having discharge spaces;

a first electrode disposed at a first end portion of the light source body; and a second electrode disposed at a second end portion of the light source body, the first and second electrodes applying a driving voltage generated by the driver circuit to the light source body.

3. The light source device of claim 2, wherein the light source body comprises:

a first substrate that has a rectangular plate shape; and a second substrate that combines with the first substrate to form the discharge spaces between the first and second substrates.

4. The light source device of claim 3, wherein the light source body further comprises:

a sealing member disposed between edge portions of the first and second substrates to combine the first and second substrates; and partition members disposed between the first and second substrates to divide a space between the first and second substrates into the discharge spaces.

5. The light source device of claim 4, wherein the partition members are disposed such that the partition members are substantially parallel to each other and at least one end portion of each partition member is spaced apart from the sealing member.

6. The light source device of claim 2, wherein the light source body comprises:

a first substrate that has a rectangular plate shape; and a second substrate that combines with the first substrate, the second substrate including a plurality of furrows that make contact with the first substrate to define the discharge spaces between the first and second substrates.

7. The light source device of claim 6, wherein a portion of each furrow of the plurality of furrows is spaced apart from the first substrate to form a connection path that connects the discharge spaces to each other.

8. A light source device comprising:

a light source that generates a light; and a driver circuit configured to control driving of the light source according to an environmental temperature of the light source device, the driver circuit comprising:

a driving voltage control section configured to sense the environmental temperature and output a control signal having a level which is adjusted based on a comparison of the environmental temperature to a reference temperature; and a driving voltage generating section electrically connected to the driving voltage control section, the driving voltage generating section configured to generate a driving voltage based on the control signal, wherein the driving voltage control section comprises:

a temperature sensing part that senses the environmental temperature;

a setting part that is previously set to the reference temperature;

a decision part electrically connected to the setting part and the temperature sensing part that outputs a comparison signal based on the environmental temperature and the reference temperature; and an integrating part electrically connected to the decision part to receive the comparison signal, the integrating part configured to output the control signal based on the comparison signal.

9. The light source device of claim 8, wherein the temperature sensing part includes a thermistor having a resistivity that varies according to the environmental temperature.

10. The light source device of claim 9, wherein the resistivity of the thermistor increases when the environmental temperature decreases, and the resistivity of the thermistor decreases when the environmental temperature increases.

11. The light source device of claim 8, wherein the temperature sensing part outputs a signal having a low level when the environmental temperature is above a predetermined threshold, and a signal having a high level when the environmental temperature is below the predetermined threshold.

12. The light source device of claim 8, wherein the setting part outputs a signal corresponding to the reference temperature.

13. The light source device of claim 12, wherein the reference temperature is set within a range of temperatures at which no channeling is induced.

14. The light source device of claim 12, wherein the decision part outputs the comparison signal by comparing the environmental temperature and the reference temperature.

15. The light source device of claim 14, wherein the decision part outputs the comparison signal having a high level when the environmental temperature is higher than the reference temperature, and outputs the comparison signal having a low level when the environmental temperature is lower than the reference temperature.

16. The light source device of claim 8, wherein the integrating part comprises a resistive element configured to convert the comparison signal outputted from the decision part into a direct current.

17. The light source device of claim 8, wherein the driving voltage control section further comprises a short pulse generating part electrically connected to the integrating part, the short pulse generating part configured to generate a short pulse for initializing the integrating part.

18. The light source device of claim 17, wherein the short pulse generating part generates the short pulse to initialize the integrating part at a low level when a light source turn-on signal is applied to the short pulse generating part.

19. A light source device comprising:

a light source that generates a light; and a driver circuit configured to control driving of the light source according to an environmental temperature of the light source device, the driver circuit comprising:

a driving voltage control section configured to sense the environmental temperature and output a control signal having a level which is adjusted based on a comparison of the environmental temperature to a reference temperature; and a driving voltage generating section electrically connected to the driving voltage control section, the driving voltage generating section configured to generate a driving voltage based on the control signal, the driving voltage generating section comprising:

an oscillating part electrically connected to the driving voltage control section, the oscillating part configured to output an output signal having an oscillating frequency which is changed based on the control signal;

a control part that is electrically connected to the oscillating part, the control part controlling an output voltage in response to a light source turn-on signal; and a voltage transforming part electrically connected to the control part, the voltage transforming part configured to boost the output voltage to produce the driving voltage.

20. The light source device of claim 19, wherein the oscillating part outputs the output signal having the oscillating frequency that increases when the level of the control signal increases.

21. A liquid crystal display (LCD) apparatus comprising:
a light source that generates light;
a driver circuit including a driving voltage control section configured to sense an environmental temperature and output a control signal having a level which is adjusted based on a comparison of the environmental temperature to a reference temperature, and a driving voltage generating section electrically connected to the driving voltage control section, the driving voltage generating section configured to generate a driving voltage based on the control signal; and
an LCD panel that displays an image using the light generated by the light source,
wherein the driving voltage control section outputs the control signal at a high level when the environmental temperature is higher than the reference temperature, and outputs the control signal at a low level when the environmental temperature is lower than the reference temperature to prevent channeling.

22. The LCD apparatus of claim 21, wherein the driving voltage control section comprises:
a temperature sensing part that senses the environmental temperature;
a setting part that is previously set to the reference temperature;
a decision part electrically connected to the setting part and the temperature sensing part that outputs a comparison signal based on the environmental temperature and the reference temperature; and
an integrating part electrically connected to the decision part to receive the comparison signal, the integrating part configured to output the control signal based on the comparison signal.

23. The LCD apparatus of claim 22, wherein the reference temperature is set within a range of temperatures at which no channeling is induced.

24. The LCD apparatus of claim 22, wherein the driving voltage control section further comprises a short pulse generating part electrically connected to the integrating part, the short pulse generating part configured to generate a short pulse for initializing the integrating part.

25. The LCD apparatus of claim 21, wherein the driving voltage generating section comprises:
an oscillating part electrically connected to the driving voltage control section, the oscillating part configured to output an output signal having an oscillating frequency which is changed based on the control signal;
a control part that is electrically connected to the oscillating part, the control part controlling an output voltage in response to a light source turn-on signal; and
a voltage transforming part electrically connected to the control part, the voltage transforming part configured to boost the output voltage to produce the driving voltage.

26. The LCD apparatus of claim 21, wherein the planar light source comprises:
a light source body having discharge spaces; and
a first electrode and a second electrode disposed at a first end portion and a second end portion of the light source body, respectively, the first and second electrodes applying the driving voltage generated by the driver circuit to the light source body.

27. The LCD apparatus of claim 26, wherein the discharge spaces are connected to each other.

* * * * *